US006625727B1

(12) United States Patent
Moyer et al.

(10) Patent No.: US 6,625,727 B1
(45) Date of Patent: Sep. 23, 2003

(54) APPARATUS AND METHOD FOR CONFIGURING A DATA PROCESSING SYSTEM BY RETRIEVING A CONFIGURATION VALUE FROM STORAGE DEVICE USING RESET VECTOR AND CONFIGURING PARAMETERS AFTER RESET

(75) Inventors: William C. Moyer, Dripping Springs, TX (US); Michael D. Fitzsimmons, Austin, TX (US); James C. Nash, Austin, TX (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/447,253

(22) Filed: Nov. 23, 1999

(51) Int. Cl.[7] ................................................. G06F 9/24
(52) U.S. Cl. ............................................... 713/1; 713/2
(58) Field of Search ......................................... 713/1, 2

(56) References Cited

U.S. PATENT DOCUMENTS

| | | | | |
|---|---|---|---|---|
| 4,692,870 A | * | 9/1987 | Manduley ..................... | 705/410 |
| 4,980,850 A | * | 12/1990 | Morgan ........................ | 364/900 |
| 5,327,531 A | * | 7/1994 | Bealkowski et al. ......... | 395/164 |
| 5,408,664 A | * | 4/1995 | Zarrin et al. .................. | 713/2 |
| 5,630,099 A | * | 5/1997 | MacDonald et al. ......... | 711/172 |
| 5,682,528 A | * | 10/1997 | Baker et al. ................. | 395/651 |
| 5,727,208 A | * | 3/1998 | Brown .......................... | 713/100 |
| 5,784,625 A | * | 7/1998 | Walker ......................... | 710/260 |
| 5,898,896 A | * | 4/1999 | Kaiser et al. ................. | 710/65 |
| 5,909,557 A | * | 6/1999 | Betker et al. ................. | 395/284 |
| 6,145,122 A | * | 11/2000 | Miller et al. ................. | 717/129 |
| 6,226,736 B1 | * | 5/2001 | Niot ............................. | 712/38 |
| 6,298,426 B1 | * | 10/2001 | Ajanovic ..................... | 711/172 |
| 6,353,927 B1 | * | 3/2002 | Ali et al. ...................... | 717/174 |
| 6,356,965 B1 | * | 3/2002 | Broyles et al. .............. | 710/104 |
| 6,480,948 B1 | * | 11/2002 | Virajpet et al. .............. | 711/202 |

* cited by examiner

Primary Examiner—Dennis M. Butler
Assistant Examiner—Nitin Patel
(74) Attorney, Agent, or Firm—Susan C. Hill

(57) ABSTRACT

A data processing system (400) is configured when coming out of reset using memories of various bit widths (440, 450, 460). The bytes that make up the reset vector (300) are fetched individually through separate memory operations from the memory that stores the reset vector. These bytes are stored in a pre-determined manner within each of the potential memory structures (440, 450, 460) such that pre-determined addresses will retrieve the different bytes on the same portion of the data bus. A configuration value (310) portion of the reset vector (300) retrieved may be used to configure various parameters (352–356, 362) within the data processing system (400) such that parameters related to the memory or other functional characteristics of the system are initialized. The configuration value (310) may include data and control sections such that the control section determines how the data section of the configuration value (310) is applied to various parameters within the data processing system (400).

37 Claims, 8 Drawing Sheets

FIG.1 —PRIOR ART—

APPARATUS AND METHOD FOR CONFIGURING A DATA PROCESSING SYSTEM BY RETRIEVING A CONFIGURATION VALUE FROM STORAGE DEVICE USING RESET VECTOR AND CONFIGURING PARAMETERS AFTER RESET

FIELD OF THE INVENTION

The present invention relates to data processors, and more particularly to a method and apparatus for configuring a data processing system after reset.

BACKGROUND OF THE INVENTION

In order to place a data processing system in a known initial state, most data processing systems are equipped with a pin or other mechanism that causes the system to reset. As the processing system comes out of the reset condition, the address of a reset vector (reset exception vector) is fetched from a known location in memory. The address is then used to fetch and execute the reset exception routine. The reset exception routine typically includes a number of instructions that initialize the system and prepare it for execution of subsequent programming instructions.

In a processing system that includes a 32-bit address space, the reset vector would include one 32-bit word that is made up of four 8-bit bytes. The reset vector is fetched from a memory structure that may be of varying bit width. For example, a 32-bit wide memory structure, a 16-bit wide memory structure, or an 8-bit wide memory structure may be used to store the reset vector for a particular system. The type of memory structure that stores the reset vector will determine the memory operations necessary to fetch the four 8-bit bytes that comprise the reset vector.

One prior art technique for determining the memory configuration of the memory storing the reset vector includes additional pins on the processing system, where signals on the additional pins indicate the memory configuration. Additional pins add cost to the processing system and are therefore undesirable.

Another prior art technique for determining the memory configuration includes sampling a data bus of the processing system. The values determined from sampling the data bus indicate the particular memory configuration in which the reset vector was stored. Although this technique enables different memory structures to be supported in the processing system, external glue logic is required in order to drive the data bus to the particular values required to indicate the memory configuration being used. The external glue logic increases the cost of the overall processing system and may adversely affect functionality of the processing system as it induces additional parasitic effects and may also increase power consumption.

Another technique for determining the configuration of the memory storing the reset vector is to include non-volatile storage means in the processing system. The non-volatile storage means can then be used to store a value that indicates the memory configuration used in a particular system. Once again, although this allows for the use of various bit width memory structures in the processing system, the inclusion of non-volatile storage means can increase system costs as non-volatile storage means, such as electrically erasable programmable read-only memory, are complex and expensive to implement. In addition to the increased costs, non volatile storage means are often difficult to reprogram, thus making the ability to change between different memory configurations more difficult.

Other prior art systems assumed a specific external memory configuration and required the external memory to conform to the assumption. FIG. 1 illustrates a processor that includes a CPU and a memory controller. Three different memory configurations are also illustrated in FIG. 1, including 32-bit, 16-bit, and 8-bit configurations. The address data and control signals used by the memory controller to access each of the different potential memory structures are also illustrated.

If the system illustrated in FIG. 1 assumes that a memory structure with a 16-bit data bus is used to store the reset vector, two sequential read operations to addresses 0x00 (hexadecimal format) and 0x02 will be performed to retrieve the four bytes (T, U, V, and W) that make up the 32-bit reset vector. Although the execution of these two accesses work with respect to the 16-bit memory, similar attempts to load the address of the reset vector using the same assumptions fail with respect to the 32-bit and 8-bit memory structures.

With respect to 8-bit memory structure, only two read operations using two addresses are performed. While the memory controller will expect to receive 16-bits of data on the D[31:0] data lines for each read operation, the 8-bit memory will only drive the D[31:24] data lines. Therefore, only two of the four bytes that comprise the reset vector address will be retrieved from the 8-bit memory.

With respect to the 32-bit memory, the address line A[1] is ignored by the 32-bit memory. As such, the two sequential reads to 0x00 and 0x02 will result in duplicate reads of the 32-bit word stored at location 0x00 in the 32-bit memory. Although the 32-bit memory drives the entire reset vector address onto the data lines D[31:0], the memory controller assumes that only 16-bits of data will be received for each memory access on data lines D[31:16]. As such, the memory controller will interpret the results of the memory operations and arrive at an address that includes two copies of two of the four bytes that make up the reset vector address (VWVW) instead of the complete 4-byte address (TUVW).

Therefore, a need exists for a method and apparatus that enables a processing system to utilize various bit width memory structures without the need for additional pins, non-volatile storage locations, or data bus sampling in order to accurately determine the address of the reset vector when coming out of reset. In addition, it is desirable to have a method and apparatus that allows for configuration of various processing system parameters immediately out of reset such that subsequent operations utilize the configured parameters.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Generally, the present invention provides a method and apparatus that enables a data processing system to be configured when coming out of reset using memories of various bit widths. In one embodiment, the four bytes that make up the reset vector are fetched individually through separate memory operations from the memory that stores the reset vector. These four bytes are stored in a pre-determined manner within each of the potential memory structures such that four predetermined addresses will retrieve the four different bytes on a common portion of the data bus. Portions of the reset vector retrieved may be used to configure various parameters within the data processing system such that additional parameters related to the memory or other functional characteristics of the system are initialized. The configuration value included in the reset vector may include data and control sections such that the control section determines how the data section of the configuration value is applied to various parameters within the data processing system.

In another embodiment, a configuration value is fetched prior to the retrieval of the reset vector from memory. The configuration value that is fetched may include information such as the bit width (data field size) of the memory structure, information regarding the access time (wait state control information) corresponding to the memory configuration, or the byte ordering (little or big endian) used in the memory configuration. As such, the configuration value retrieved can be utilized to configure parameters that control the subsequent fetching of the reset vector from memory such that storage of the reset vector in the memory structure can be optimized to suit the type of memory utilized. In other embodiments, the configuration value retrieved may be used to configure parameters that enable/disable debug or emulation features included in the data processing system.

The present invention enables a data processing system to utilize varying configurations of memory for storage of the reset vector which was not possible in prior art systems without the addition of non-volatile storage means, additional glue logic, or additional pins. Configuration information that may be fetched in addition to, or included in the reset vector, can be used to initialize additional parameters within the processing system such that the initial execution of instructions out of reset is performed in a more efficient manner than was possible in prior art solutions that required the execution of a number of instructions in order to configure such parameters.

Figure 1:
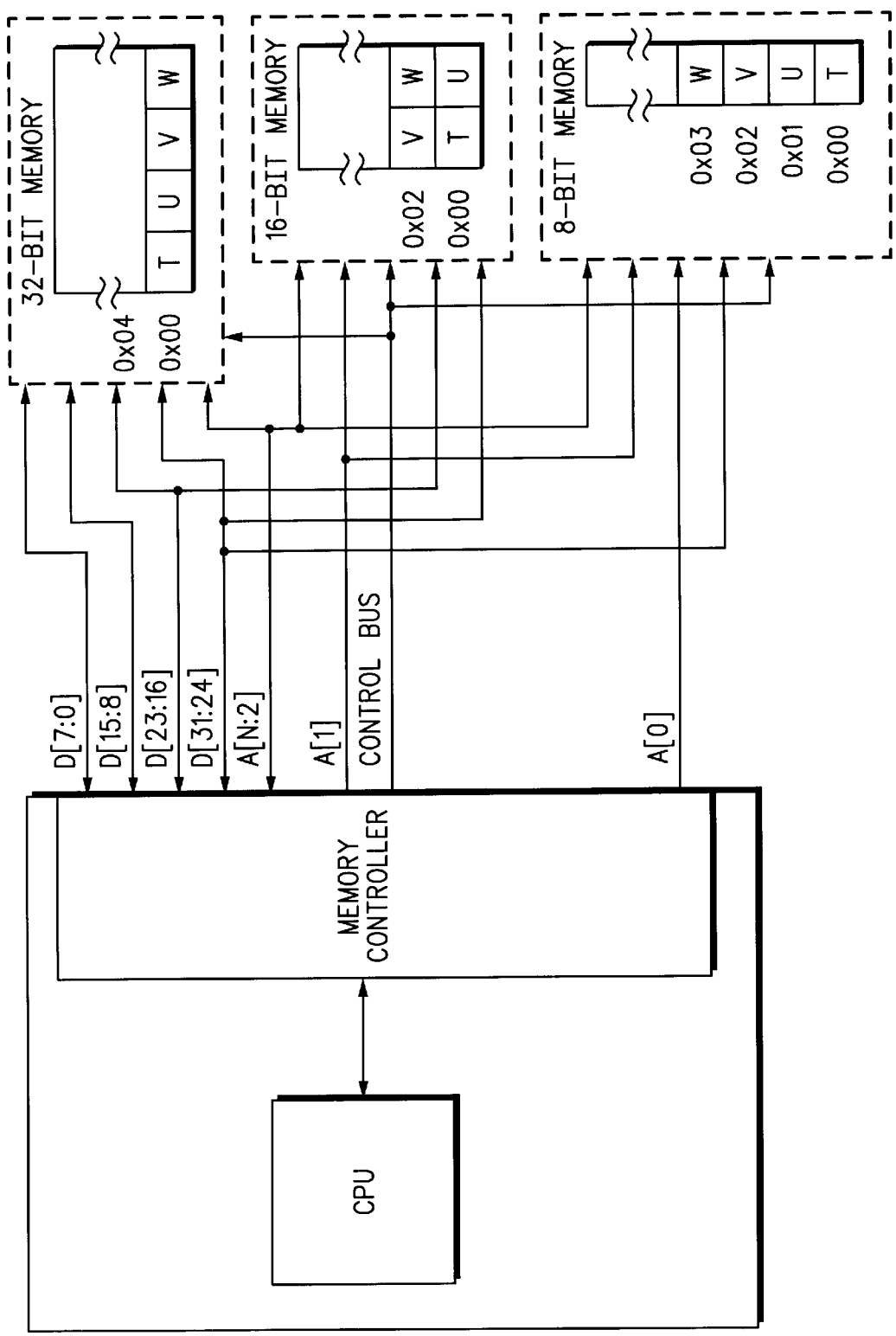
FIG. 1 illustrates a block diagram of a prior art processing system.
Figure 2:
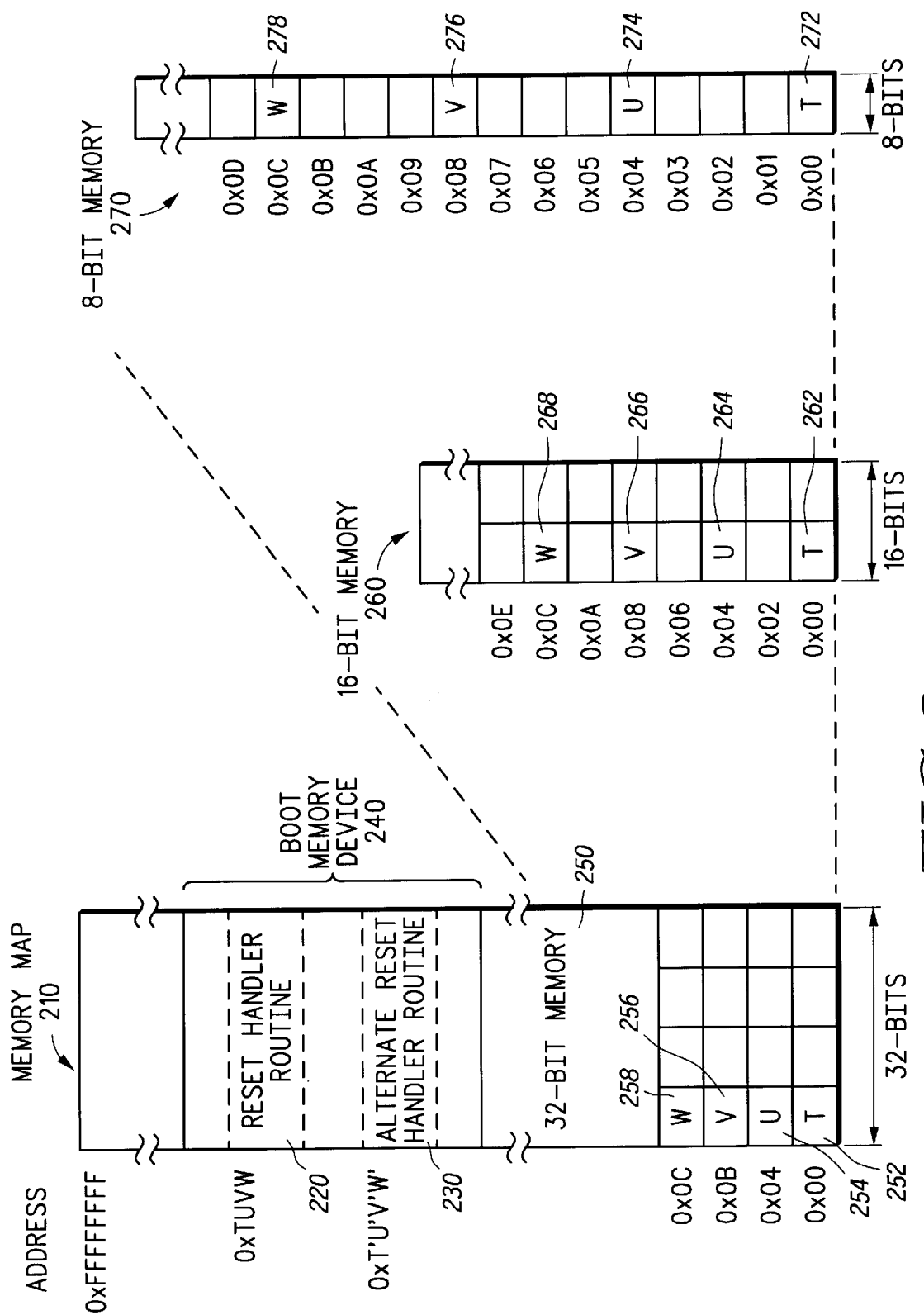
FIG. 2 illustrates a block diagram of various memory configurations storing a reset vector address in accordance with a particular embodiment of the present invention.

The invention can be better understood with reference to FIGS. 2–8. FIG. 2 illustrates a memory map 210 that may be used in conjunction with a data processing system. Locations within the memory map 210 are defined using the address bits which are shown to range from 0x00–0xFFFFFFFF. The reset handler routine 220 is included within the memory map 210 and executed after the processing system comes out of reset. In order to execute the reset handler routine 220, the address of the reset handler routine 220, which may be referred to as the reset vector, is fetched from memory. The reset vector is shown to have a value of 0xTUVW. Each of the characters T, U, V, and W represents an 8-bit byte portion of the 32-bit reset vector.

As is illustrated, the reset handler routine 220 is preferably stored in a boot memory device 240. The reset vector that must be fetched in order to execute the reset handler routine 220 may also be stored within the boot memory device 240, or it may be stored in a separate memory device. In order to facilitate fetching of the four bytes that make up the reset handler routine address, the four bytes are stored in non-adjacent byte locations within each of the various memory configurations. Thus, adjacent portions of the reset vector are stored at addresses that are not adjacent in the memory and are separated by at least one bit. Preferably, the separation of the portions of the reset vector in memory is based on a function of the width of the data bus for the processing system. Subsequent addresses for the portions of the reset vector are preferably generated by incrementing a first (base) address by an increment value which is equal to the number of bytes in the data bus. For example, if the bus width of the data bus is 32 bits (four bytes), the separation of the byte portions may be four bytes as illustrated in FIG. 2. Thus, the address is incremented by four to step between portions of the reset vector.

In the description provided herein, the term "bus" is used to refer to a plurality of signals or conductors which may be used to transfer one or more types of information, such as data, address, control, or status information. Brackets are used to indicate the conductors of the bus or the bit locations of a value. For example, D[31:24] may be used to indicate the most-significant 8 bits of a data bus.

In the 32-bit memory 250, which returns 32-bits of data for each memory access, each of the four bytes of the reset handler routine address is included in the most significant byte of a separate 32-bit word. Thus, the most significant byte of the reset vector, T 252, is the most significant byte of the word at location 0x00. As such, when a first read operation to address 0x00 is performed, the value T will be present on the D[31:24] data lines of the data bus. Three subsequent read operations will return the values U 254, V 256, and W 258 on the same portion of the data bus using addresses 0x04, 0x08, 0x0C in subsequent read operations.

The same memory operations that retrieve the values T-W 252–258 from the 32-bit memory 250 can be used to retrieve the values T-W 262–268 from the 16-bit memory 260. Note that the 16-bit memory will only drive 16-bits of the data bus, and therefore should be coupled to the data bus in a manner such that the most significant data byte retrieved for a specific address is returned on the most significant portion (D[31:24]) of the data bus. Thus, a memory operation that reads location 0x00 from the 16-bit memory 260 will return the data T 262 on the same portion of the data bus as a read operation to that address using the 32-bit memory 250.

FIG. 2 also illustrates an 8-bit memory 270 that stores the 4 bytes that make up the reset vector in a manner that allows the same memory operations applied to either the 32-bit memory 250 or the 16-bit memory 260 to retrieve the appropriate values for reset vector. Therefore, the four memory read operations that access addresses 0x00, 0x04, 0x08, and 0x0C can be applied to the 8-bit memory 270 such that the values T-W 272–278 are returned, respectively. In order to enable the data to be driven on the same portion of the data bus for each of the various memory configurations, the 8-bit memory 270 should be configured to drive the most significant 8-bit portion of the data bus (D[31:24]).

Figure 3:
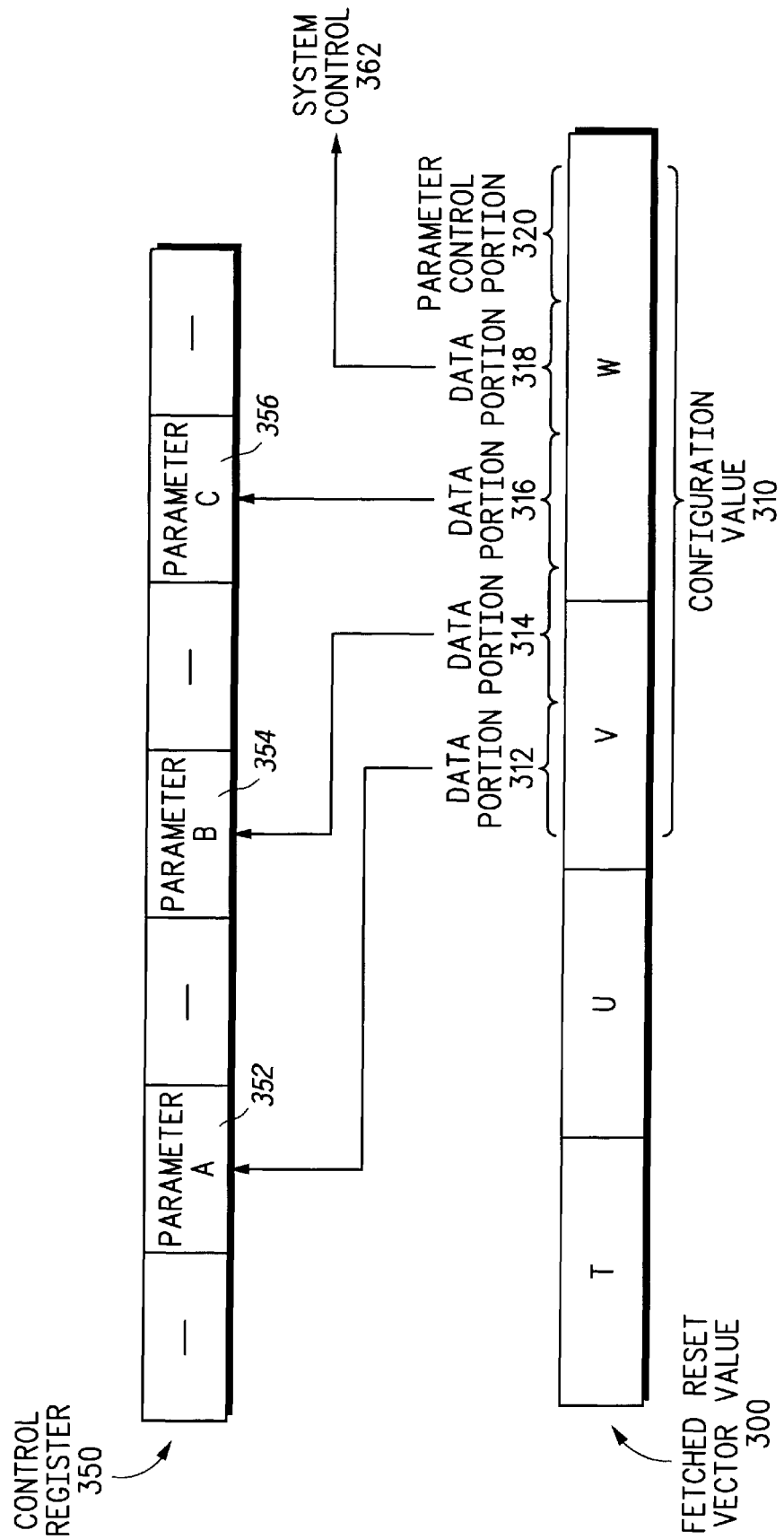
FIG. 3 illustrates a block diagram of a fetched reset vector value being utilized for control register configuration in accordance with a particular embodiment of the present invention.

FIG. 3 illustrates the use of a configuration value 310 that is included in a fetched reset vector value 300 for configuring one or more parameters within the processing system. As is illustrated, the fetched reset vector value 300 includes four data bytes T, U, V, and W that make up the address at which the reset handler routine is stored. By utilizing a portion of the bits that make up the fetched reset vector value 300 as a configuration value 310, configuration parameters for the data processing system can be retrieved during the initial retrieval of the fetched reset vector value 300 immediately following a reset condition. As such, the parameters configured through the use of the configuration value 310 are configured immediately coming out of reset, thus enabling subsequent processing system operations to utilized the modified parameter values.

Note that the settings of the bits included in the configuration value 310 that may be required to configure specific parameters within the processing system in a particular manner will result in a change to the address that is indicated by the fetched reset vector value 300. As such, the boot memory device 240 may be structured to include more than one reset handler routine. Each of these routines is sored at an addresses that corresponds to one of the various values that can result for the fetched reset vector value 300 based on the specific settings within the configuration value 310. FIG. 2 illustrates one such alternate reset handler rouine 230 that is stored at address 0xT'U'V'W'. Note that the alternate reset handled routine 230 may simply may be a pointer that redirects the processor to another location that stores the actual routine that is executed. Therefore, if multiple configuration values 310 may be expected in a particular system, multiple handler routines corresponding to multiple reset vector addresses may be included in the boot memory device 240.

Because different settings within the configuration value 310 require multiple reset handler routines (even if they are just pointers) the configuration value 310 is preferably included in the less-significant portion of the fetched reset vector value 300. As such, the area of memory within the boot memory device 240 over which the multiple reset handler routines that may be required are spread is reduced. If more significant bits within the fetched reset vector 300 are used for the configuration value 310, the multiple routines will be spread throughout the boot memory device 240, thus reducing the efficiency with which the boot memory device 240 can be used for other purposes.

The configuration value 310 may be a single bit that configures a particular parameter within the processing system or it may be a plurality of bits that may configure one or more parameters within the processing system. If multiple bits are included in the configuration value 310, the configuration value 310 may include a data section and a control section. The data section corresponds to actual data values that would be stored at particular parameter locations in order to configure those parameters to the proper settings. The control section may be used to control the application of the data section of the configuration value 310 or portions thereof.

The example illustrated in FIG. 3 shows the data section to include a plurality of data portions 312–318. The control section of the configuration value 310 in the example of FIG. 3 is shown to include a parameter control portion 320. As is illustrated, the data portions 312–316 are applied to the parameters A 352, B 354, and C 356 of the control register 350.

The control register 350 may reside within a CPU, an interface block, or other additional logic included within the data processing system. The control register 350 may be a chip select control register that controls the manner with which the data processing system interfaces with a block that is accessed via a chip select signal. In one example, the control register 350 is a chip select registers that corresponds to a memory structure. In such an example, the parameter A 352 may correspond to the number of wait states to be utilized for an access to the memory structure selected by the chip select signal. The parameter B 354 may correspond to a dead cycle parameter that determines if the processing system includes dead cycles in memory operations. Finally, the parameter C 356 may correspond to the width of the data bus of the memory structure. Thus, upon coming out of reset the correct parameter settings for the particular memory structure will be included in the chip select register such that subsequent memory operations are properly structured.

In another embodiment, the control register 350 may correspond to a control register that controls debugging or emulation settings and operations. As such, the parameters A-C 352–356 may determine whether or not certain de-bugging or emulation modes are operational. For example, show states, which enable internal signals to be visible on externally accessible signals, may be enabled or disabled by one of the parameters A-C 352–356. Other debugging and emulation functionality may include performance monitoring, program tracing, enabling a direct entry into a debug mode upon exiting the reset state, enabling/disabling clocks to one or more modules, enabling a fast or slow clock rate out of reset, etc.

The data portion 318 of the configuration value 310 may be provided to a system control parameter 362 that is external to the control register 350. Similarly, different portions of the data section of the configuration value 310 may be applied to various parameters throughout the data processing system. As such, the data portions may configure parameters corresponding to a wide range of functionality of the data processing system.

As stated earlier, the control section of the configuration value 310, which in the illustration of FIG. 3 includes the parameter control portion 320, may be used to control the application of the various data portions 312–318 to their respective parameters. In one embodiment, the parameter control portion 320 may be a single bit that indicates whether or not any of the data portions 312–318 should be applied to their respective parameters. In another embodiment, the data portions 312 and 314 may be applied to the respective parameters regardless of the state of the parameter control portion 320. However, in the same embodiment, the data portions 316 and 318 may be controlled by the parameter control portion 320 such that they may or may not be applied to their respective parameters based on the state of the parameter control portion 320.

In yet other embodiments, the parameter control portion 320 may include a plurality of bits that each pertain to certain data portions within the configuration value 310. Thus, each data portion 312–318 may have a corresponding bit within the parameter control portion 320 that determines whether or not that particular data portion is applied to its respective parameter. Note that in some embodiments only some of the data portions 312–318 may be controlled by a corresponding bit within the parameter control portion 320.

Another potential use for the control section of the configuration value 310 is to determine the respective parameters to which each of the data portions 312–318 is or is not applied. Thus, the control section of the configuration value 310 may determine whether a particular data portion is applied to a first parameter in a first control register or to a second parameter that may be located within the same control register or another control register. As is apparent to one of ordinary skill in the art, various combinations of data and control sections could be utilized within the configuration value 310 to achieve the required parameter configurations within a particular data processing system.

Figure 4:
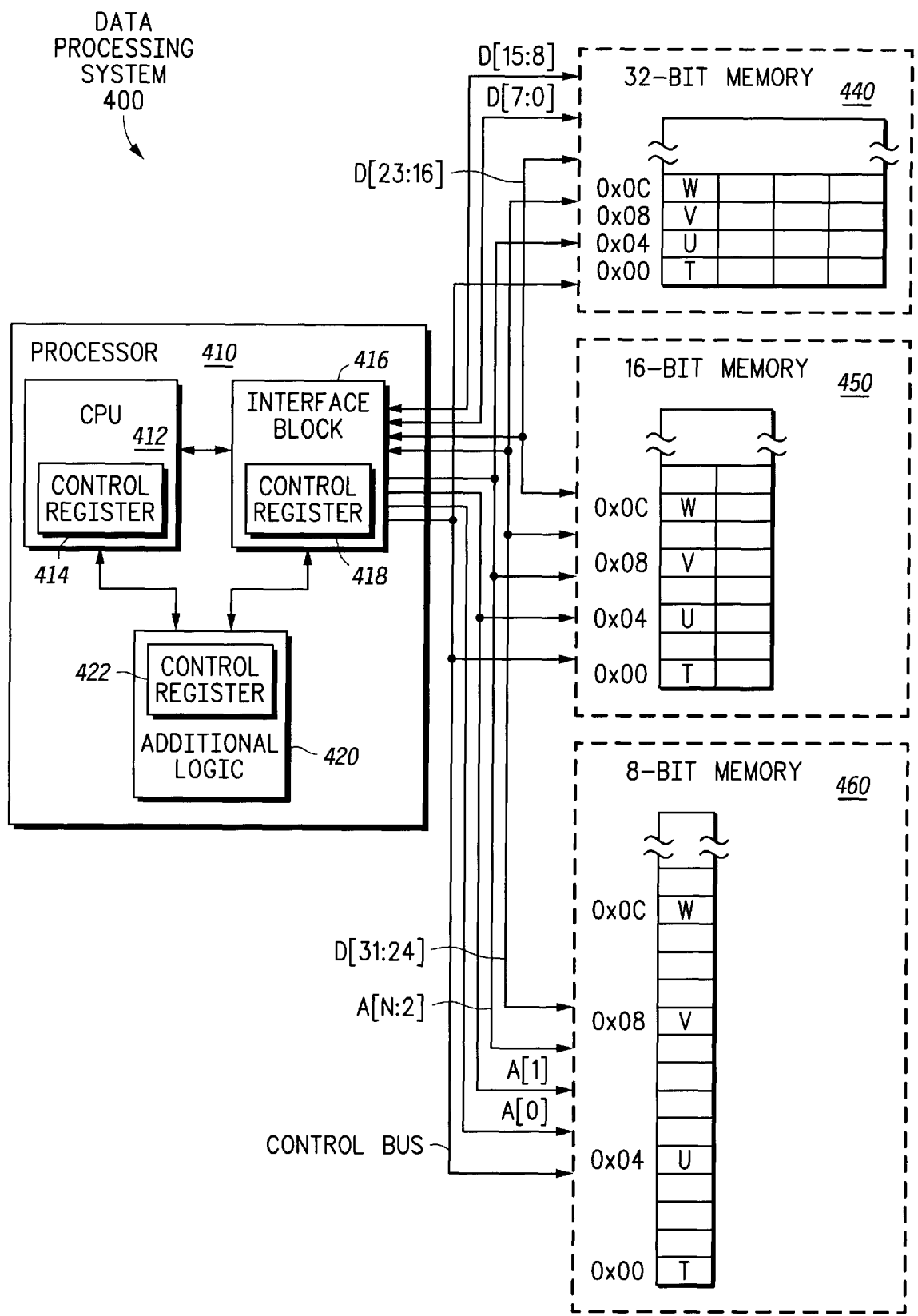
FIG. 4 illustrates a block diagram of a data processing system in accordance with a particular embodiment of the present invention.

FIG. 4 illustrates a data processing system 400 that includes the flexibility to couple to the various memory configurations illustrated. The data processing system 400 includes the processor 410 and at least one of the 32-bit memory 440, the 16-bit memory 450, and the 8-bit memory 460. The processor 410 includes a central processing unit (CPU 412) that is operably coupled to interface circuitry (interface block 416). The processor 410 may be formed on a single integrated circuit and may be a microcontroller or similar device. Each of the memory structures may be any type of memory.

The processor 410 may also include additional logic 420 that is operably coupled to one or both of the CPU 412 and the interface block 416. The additional logic 420 may be-debug/emulation circuitry that is used to provide debug and/or emulation functionality to the system. Such debug/emulation functionality may include enabling show cycles, background debug modes, program tracing, etc. The interface block 416 is coupled to the memory structure (storage circuitry) that is included in the data processing system 400. In the embodiment illustrated in FIG. 4, the processor 410 includes a 32-bit data bus and an N-bit address bus. The control signals required to perform memory operations are carried to the memory devices via a control bus.

In the case where a 32-bit memory 440 is included in the data processing system 400, the entire data bus (D[31:0]) will be driven when a memory read operation is initiated by the interface block 416. If the data bytes corresponding to the reset vector address (T-W) are stored within the 32-bit memory 440 as is illustrated, four read operations using the addresses 0x00, 0x04, 0x08, and 0x0C will cause the four bytes that make up the reset vector to be presented to the interface block 416 via the data lines D[31:24].

Note that the separation between the addresses used to retrieve these values is at the minimal address increment possible within the 32-bit memory 440. The minimum increment here is determined based on the fact that the 32-bit memory 440 either does not receive or ignores the address lines A[1:0].

In a data processing system that includes the 16-bit memory 450, the same memory operations that were described above for retrieving the reset vector from the 32-bit memory 440 can be used to retrieve the reset vector from the 16-bit memory 450 on the same portion of the data bus. Note that the 16-bit memory 450 does not disregard the address line A[1]. However, by spacing the bytes that make up the reset vector based on the addressing granularity possible within the 32-bit memory 440 (which has the greatest bit-width possible in-the example data processing system shown), the addresses used to fetched the reset vector can be universally applied to the various potential memory configurations.

If the data processing system includes an 8-bit memory 460, the same set of addresses used to retrieve the reset vector for a 32-bit or 16-bit memory system can be utilized the retrieve the reset vector from the 8-bit memory 460. Note that the 8-bit memory 460 receives and utilizes the address lines A[1:0]. However, because the address locations selected for storing the byte portions of the reset vector are distanced from each other based on the minimum granularity addressable in the 32-bit memory 440, the addresses used to retrieve the reset vector may be universally applied. Note that the 8-bit memory 460 is only coupled to an 8-bit portion of the data bus. In the example shown in FIG. 4 this includes the data lines D[31:24]. As such, the interface block 416 should expect to receive the data corresponding to the various portions of the reset vector on those particular data lines. As is apparent to one of ordinary skill in the art, the particular data lines used to retrieve the data bytes that make up the reset vector address may be modified based on the connections between the interface block 416 and the potential 8- and 16-bit memory structures 450 and 460.

As was described with respect to FIG. 3, the reset vector may include a configuration value that is applied to various parameters within the data processing system 400. The processor 410 is shown to include a number of control registers 414, 418, and 422 within its various blocks that may include parameters that may be configured based on this configuration value. For example, the CPU 412 is shown to include a control register 414, the interface block 416 is shown to include a control register 418, and the additional logic block 420 is shown to include a control register 422. Thus, the configuration value that may be included within the reset vector may include values that are applied to parameters that may be included in one or more of these control registers 414, 418, and 422.

Figure 5:
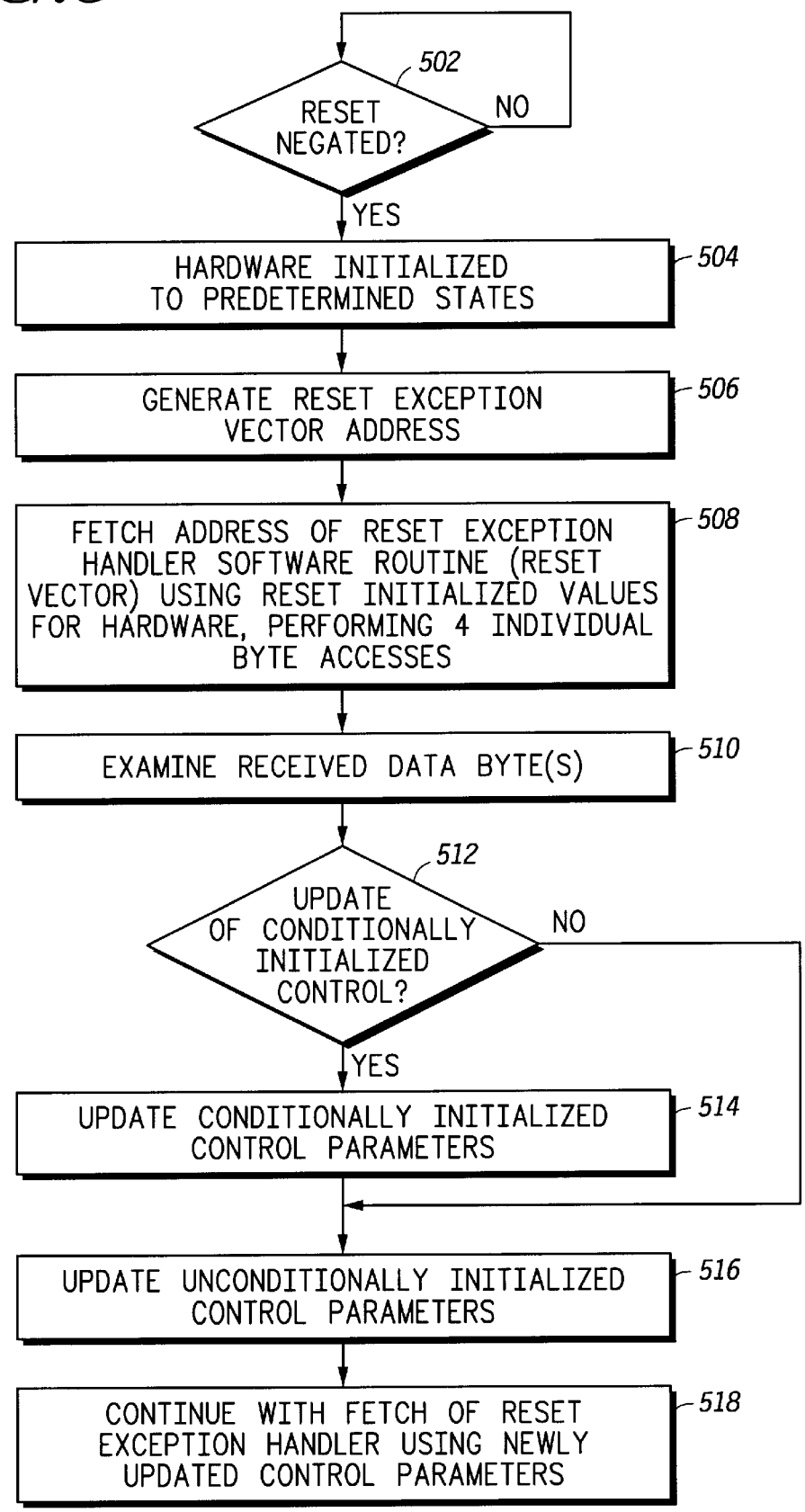
FIG. 5 illustrates a flow diagram of a method for configuring a data processing system in accordance with a particular embodiment of the present invention.

FIG. 5 illustrates a flow diagram corresponding to a method for configuring a data processing system. The method begins at step 502 where the data processing system begins in a reset state. When the reset signal is negated such that the reset state is to be exited, the method proceeds to step 504. At step 504, the hardware within the data processing system is initialized to various predetermined states that enable the data processing system to begin operation.

At step 506, a reset vector address is generated. In the data processing system 400 of FIG. 4, the reset vector address generated at step 506 would correspond to the base address used to retrieve the reset vector from memory. In the specific example illustrated in FIG. 4, this would correspond to the address 0x00. It should be noted that the base address for the reset vector might be located at various points within the memory structure.

At step 508 the address of the reset exception handler routine (reset vector) is fetched using the reset initialized values for the hardware. In a system that includes a 32-bit addressing space, the reset vector is fetched by performing four individual byte accesses from memory. The four individual byte accesses are performed by initially accessing the memory based on the reset vector address and then incrementing that address by a known quantity to produce the subsequent address for the subsequent byte access. Preferably, the increment used to generate the subsequent address is equal to the width as measured in bytes of the largest bit-width memory in which the reset vector may be stored. For example, if a 32-bit memory is the largest, the increment will be a four. Note that in the example any multiple of four would also work as the increment, but larger increments may use memory space less efficiently. Using the byte-width of the largest bit-width memory as the increment enables the byte portions of the reset vector to be as closely spaced as possible within the various memory structures. Fetching the reset vector in such a manner enables a data processing system to operate with a number of different memory configurations that may store the bytes that make up the reset vector.

At step 510 the data bytes received through the fetching performed at step 508 are examined. As was described with respect to FIG. 3, the reset vector that has been fetched may include a configuration value. The configuration value may include a control section and a data section such that various portions of the data section may or may not be applied to various parameters within the system based on portions of the control section. Therefore, some data portions that may be included in the configuration value may be applied unconditionally, whereas other data portions may be applied in a conditional manner.

At step 512 it is determined whether any conditional updates are to be performed. Preferably, this is accomplished by examining the control portions of the configuration value. If the control portions indicate that any conditional data portions are to be applied to their respective control parameters, the method proceeds to step 514. If there are no conditional updates to be performed, the method proceeds to step 516.

At step 514, the data portions that are to be conditionally applied to their respective control parameters are used to update these control parameters. Thus, the initialized values that were determined for these control parameters at step 504 are overridden by the data portions included in the configuration value. At the completion of step 514 the method proceeds to step 516.

At step 516, those data portions of the configuration value that are to be unconditionally applied to their respective parameters are used to update those respective parameters. Thus, the former values stored at these parameters based on the initialization state are overridden by the values included in the unconditionally applied data portions of the configuration value. For example, if the hardware were initially configured to interact with an external 16-bit wide memory structure, the reset vector that is fetched at step 508 may include a configuration value that reconfigures this particular parameter to reflect that a 32-bit memory is in fact being utilized.

At step 518, the fetching and execution of the reset exception handler is continued, where the continued fetching and execution utilizes the newly updated control parameters which may have been modified at steps 514 and 516. Therefore, the second bus access to occur in the system following the first bus access that fetches the control value utilizes the reconfigured parameters resulting from the control value fetched during the first bus access. As such, the fetching and execution that occurs at step 518 may be performed in a more efficient manner than is possible if the standard initialized values stored in these control parameters at step 504 were left in place. For example, if the system is initialized to a 16-bit external memory and a 32-bit external memory is actually present, the modification of the parameter that indicates the bit width of the external memory would enable the fetching that occurs at step 518 to be performed in a much more efficient manner as all 32-bits of the data bus would be considered relevant rather than only a 16-bit portion thereof.

Figure 6:
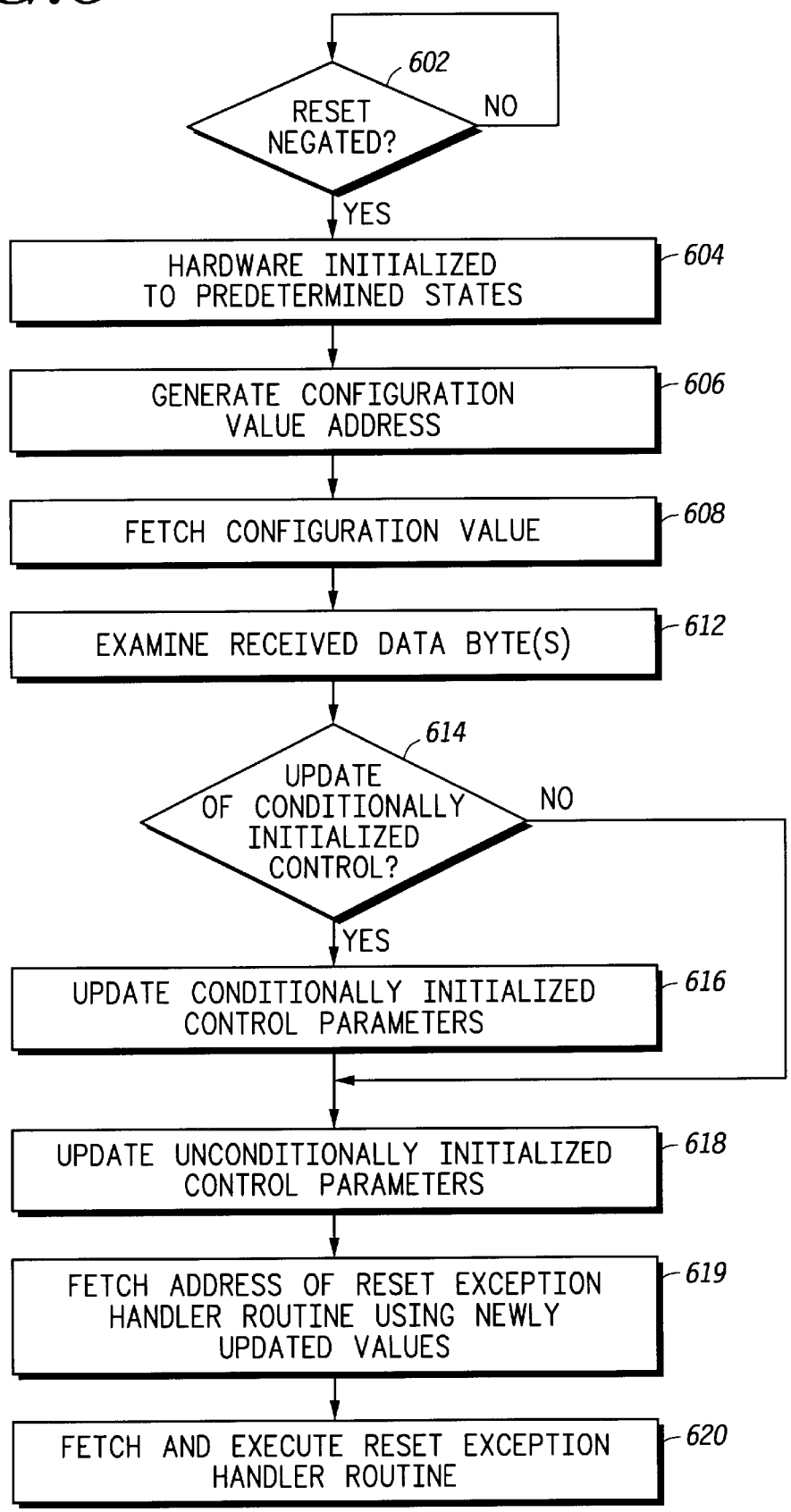
FIG. 6 illustrates a flow diagram of an alternate method for configuring a data processing system in accordance with a particular embodiment of the present invention.

The embodiments of the invention described with respect to FIGS. 2–5 have included the potential for a configuration value in the fetched reset vector. In an alternate embodiment, the configuration value is fetched as a stand-alone data portion in anticipation of subsequent fetching of the reset vector. Thus, prior to performing the fetching of the reset vector after coming out of the reset state, the configuration value may be retrieved and used to alter the initialized states within the system such that the fetching of the reset vector and other subsequent memory and other operations are performed in a more efficient manner. A flow diagram that illustrates a method that employs such a technique is illustrated in FIG. 6.

A step 602 it is determined if the reset signal which causes the processing system to remain in the reset state has been negated. When the reset signal has been negated, the method proceeds to step 604. Step 604 is similar to step 504 of FIG. 5 in that the hardware is initialized to predetermine states.

At step 606, a configuration value address is generated. At step 608, the configuration value address is used to retrieve a configuration value from memory. The configuration value is retrieved using a bus access to a storage device (one of the memory structures) that is initiated prior to any other bus accesses after the negation of the reset signal. The retrieval of the configuration value may be performed by the CPU 412 in the system or by the memory interface 416. The configuration value may include a single byte of data or multiple data bytes depending on the number of parameters that are to be altered from their initialized states. In the case where the configuration value includes multiple bytes, a similar addressing scheme as was used to fetch the reset vector in FIGS. 2 and 4 should be utilized to ensure that the processing system can successfully come out of reset when supporting a variety of different potential memory configurations.

At step 612 the one or more data bytes retrieved that make up the configuration value are examined. At step 614, it is determined whether or not there are conditional updates that need to be performed where the determination is based on a control section of the configuration value. If the control section indicates that certain conditional updates are to occur, the method proceeds to step 616. If no conditional updates are to occur, the method proceeds directly to step 618, bypassing step 616.

Figure 7:
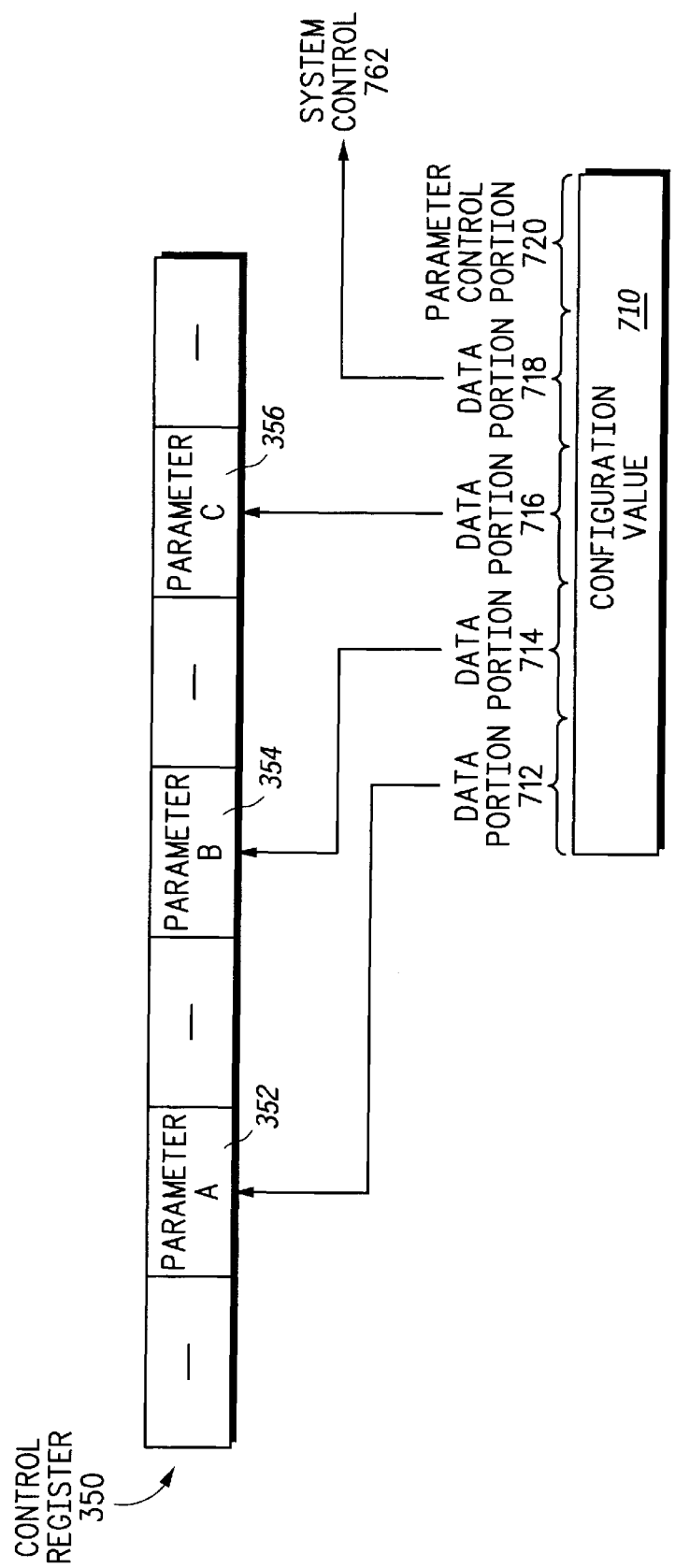
FIG. 7 illustrates a block diagram of a configuration value being used to configure a control register in a processing system in accordance with a particular embodiment of the present invention.

At step 616, any conditional updates to parameters that are to occur are performed. At step 618, any updates that are unconditional, or not dependent on any particular state in the control section, are also performed. Thus, steps 616 and 618 may configure various parameters such that their states are altered from the states that were set in the initialization step 604. This may be accomplished by storing at least a portion of the configuration value retrieved in a control register as is illustrated in FIG. 7. Preferably, the parameter configuration occurs prior to any additional bus accesses following the initial retrieval of the configuration value.

Once the various parameters have been altered to configure the system, the method proceeds to step 619 where the address of the reset exception handler routine is fetched using the newly updated values for the various parameters. Thus, if the parameters updated at steps 616 and 618 include parameters corresponding to a chip select register that is used to address a memory that stores the address of the reset exception handler, the fetching performed at step 619 will be performed in a more efficient manner than was possible based on the original initialization settings. At step 620, the reset exception handler routine is retrieved via bus cycles that include memory read operations and executed based on the address retrieved at step 619. Note that the fetch and execution performed at step 620 will also be performed utilizing the modified parameter values, which may include the data width, byte ordering, number of required wait states, or other bus timing characteristics corresponding to the memory included in the system. Configuring the parameters may enable the fetch and execution to occur in a more efficient manner than would have been possible with the original initialized values for these parameters.

In other embodiments, the parameters configured based on the configuration value include those associated with debug or emulation features included in the processing system. As such, the debug or emulation features can be enabled or disabled immediately out of reset, which may enhance the use of such features.

FIG. 7 illustrates a block diagram that reflects the use of a configuration value to configure various parameters included in the data processing system. The configuration value 710 is shown as a stand-alone value that may be unrelated to the reset vector, which is not the case with the configuration value 310 of FIG. 3. Thus, the configuration value 710 can be fetched from memory prior to fetching the reset vector for the processing system.

As was the case with the configuration value 310 of FIG. 3, the configuration value 710 of FIG. 7 may include a data section and a control section. As is illustrated, the data section for the configuration value 710 in FIG. 7 includes data portions 712–718. These data portions are used to configure the various parameters A-C 352–356 of the control register 350 and may also be used to configure other system control parameters 762 located external to the control register 350. Note that the parameters A-C may be the various parameters described with respect to specific chip select control registers or those control registers associated with debugging or emulation operations. The parameter control portion 720 of the configuration value 710 can be used to determine whether or not certain updates to various parameters in the system are performed. Thus, some of the updates to various parameters may be performed in a conditional manner as controlled by the control section of the configuration value 710.

Figure 8:
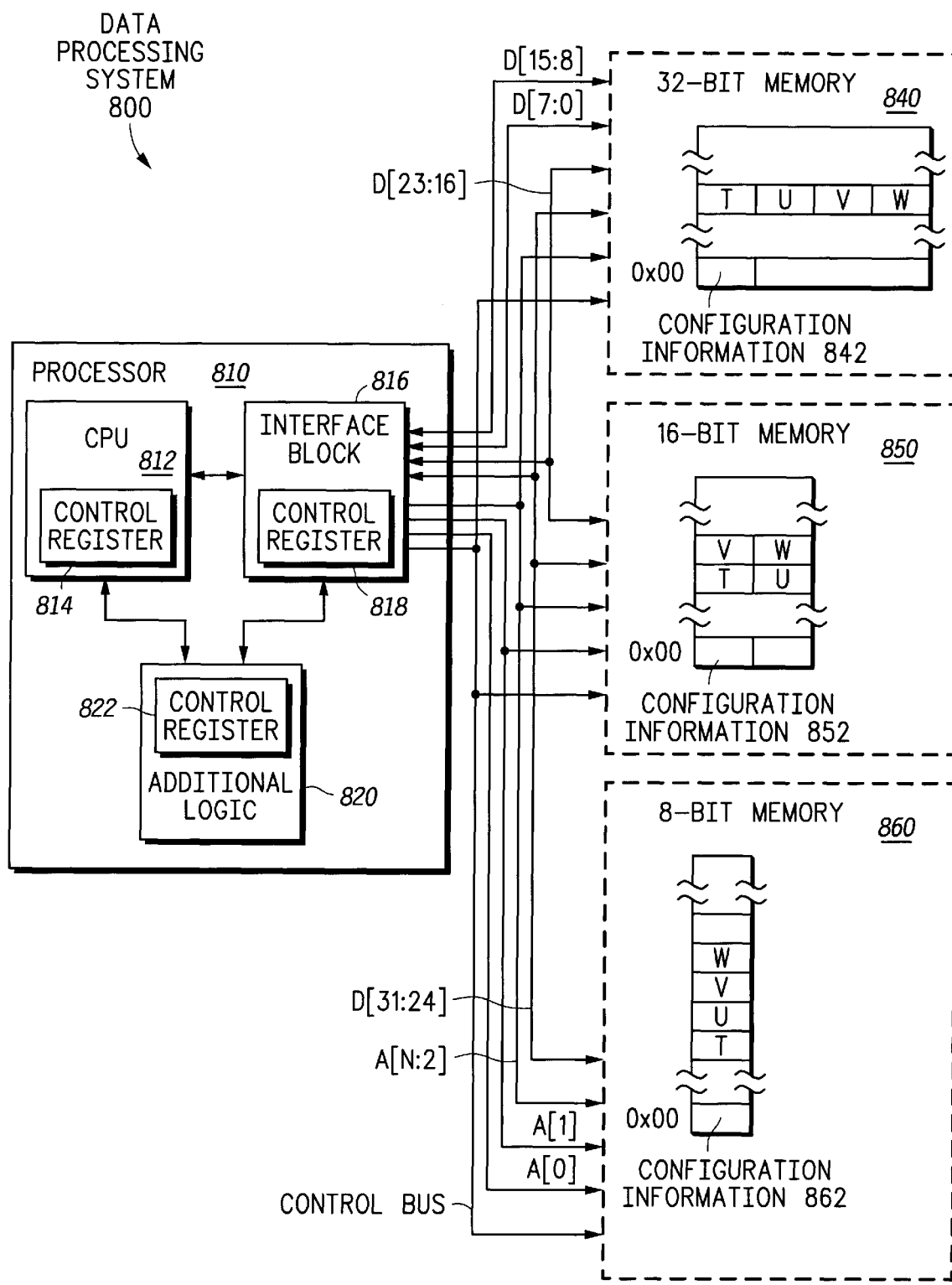
FIG. 8 illustrates a block diagram of a data processing system in accordance with another particular embodiment of the present invention.

FIG. 8 illustrates a data processing system 800 that is shown to include a processor 810 that is coupled to one or more of three different potential memory configurations. Thus, the processor 810 may be coupled to any one of the 32-bit memory 840, the 16-bit memory 850, and the 8-bit memory 860. As was the case with the processor 410 of FIG. 4, the processor 810 includes a CPU 812 that includes a control register 814, an interface block 816 that includes a control register 818, and additional logic block 820 that includes a control register 822. As is illustrated, the CPU 812 is operatively coupled to the interface block 816 that provides the CPU with access to the memory. The additional logic 820 is operably coupled to one or more of the CPU 812 and the interface block 816.

As is illustrated with respect to each of the memories 840, 850 and 860, the configuration information 862 is stored in a location that is accessed via the same address within each of the various memory configurations. More specifically, for the example illustrated the address 0x00 can be used to retrieve the configuration information from any one of the various memory structures, where the data lines 31:24 will be driven with the configuration information from the memory selected.

The configuration information 862 of the 8-bit memory 860 preferably includes parameter settings such that the interface block 816 will be configured to recognize that an 8-bit memory 860 is included in the data processing system. As such, the subsequent memory operations to the 8-bit memory 860 can be tailored to suit the memory's configuration. As such, the reset vector that includes the reset vector data bytes T, U, V, and W can be stored at sequential memory addresses with the 8-bit memory 860, and these sequential memory addresses will be accessible by the interface block 816.

In contrast, the 16-bit memory 850 preferably includes its own configuration information 852 that informs the interface block 816 that a 16-bit memory is included in the data processing system 800. As such, the data bytes corresponding to the reset vector can be arranged in two 16-bit half words within the 16-bit memory 850 and the interface block 816 will be capable of retrieving and utilizing the reset vector in that format.

When included in the data processing system 800, the 32-bit memory 840 also preferably includes its own unique set of configuration information 842 that includes parameter settings such that the interface block 816 will recognize that the 32-bit memory 840 is included in the data processing system 800. As such, a single word access to the 32-bit memory 840 can be used to retrieve the reset vector such that the reset exception routine can be executed. Note that by allowing the configuration information to be retrieved prior to the reset vector, the parameter settings included within the configuration information can be utilized in retrieving the reset vector such that such retrieval is performed in a manner that is most optimal for the memory structure included in the data processing system.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for configuring a data processing system, comprising the steps of:

retrieving a first portion of a reset vector from a first address; and retrieving a second portion of the reset vector from a second address that is not adjacent to the first address, wherein at least one bit separates the first and second portions of the reset vector, wherein the at least one bit is not used to store any portion of the reset vector.

2. The method of claim 1, wherein said step of retrieving the first portion is performed during a first bus cycle and said step of retrieving the second portion is performed during a second bus cycle.

3. The method of claim 1, further comprising the step of:
transferring the first portion and the second portion of the reset vector on at least a portion of a data bus, said data bus having a data bus width, wherein a difference between the first address and the second address is a function of the data bus width.

4. The method of claim 3, further comprising the step of:
generating the second address by incrementing the first address by an increment value, wherein the increment value is equal to a number of bytes in the data bus width.

5. The method of claim 4, wherein the number of bytes in the data bus width is four and the increment value is four.

6. A data processor, comprising:
interface circuitry which performs a first bus cycle after reset to retrieve a configuration value;
storage circuitry, coupled to the interface circuitry, said storage circuitry storing the configuration value;
debug/emulation circuitry, coupled to the storage circuitry, wherein said debug/emulation circuitry is at least partially configured by the configuration values,
wherein a first portion of the configuration value is retrieved using a first address and a second portion of the configuration value is retrieved using a second address, and wherein the second address is not adjacent to the first address.

7. The data processor of claim 6, wherein the configuration value is a portion of a reset vector.

8. The data processor of claim 6, wherein the configuration value selects at least one of a plurality of clock rates.

9. The data processor of claim 6, wherein the configuration value enables entry into a debug mode.

10. The data processor of claim 6, wherein the configuration value determines at least one of enabling and disabling of a clock.

11. The data processor of claim 6, wherein the configuration value determines at least one of enabling and disabling of at least one show state.

12. The data processor of claim 6, wherein the configuration value determines at least one of enabling and disabling of program tracing.

13. The data processor of claim 6, wherein the configuration value determines at least one of enabling and disabling of performance monitoring.

14. A method for configuring a data processing system, comprising the steps of:
in response to negation of a reset signal, initiating a first bus access to a storage device, wherein the first bus access is performed prior to any other bus accesses after negation of the reset signal;
retrieving a configuration value from the storage device; and
before performing a subsequent bus access, configuring a parameter of the data processing system using the configuration value,
wherein the parameter specifies a bus timing characteristic, and wherein the bus timing characteristic comprises bus wait state information which is utilized during the subsequent bus access.

15. The method of claim 14, further comprising the step of:
storing at least a portion of the configuration value in a control register.

16. The method of claim 15, wherein the control register is a chip select control register that is associated with a corresponding chip select signal.

17. The method of claim 14, further comprising the step of:
initiating a second bus access, wherein the parameter is utilized during the second bus access.

18. The method of claim 17, further comprising the step of:
fetching at least a portion of a reset vector during the second bus access.

19. The method of claim 17, wherein the parameter specifies a data width of at least a portion of data transferred during the second bus access.

20. The method of claim 14, wherein the configuration value comprises a control section and a data section.

21. The method of claim 20, wherein at least a portion of the data section is conditionally used based upon information in the control section.

22. The method of claim 14, wherein the configuration value is at least a portion of a reset vector.

23. The method of claim 14, wherein a first portion of the configuration value is retrieved using a first address and a second portion of the configuration value is retrieved using a second address, and wherein the second address is not adjacent to the first address.

24. A method for configuring a data processing system, comprising the steps of:
in response to negation of a reset signal, initiating a first bus access to a storage device, wherein the first bus access is performed prior to any other bus accesses after negation of the reset signal;
retrieving a configuration value from the storage device; and
before performing a subsequent bus access, configuring a parameter of the data processing system using the configuration value,
wherein the parameter selects one of a little endian configuration and a big endian configuration in the data processing system.

25. The method of claim 24, further comprising the step of:
storing at least a portion of the configuration value in a control register.

26. The method of claim 25, wherein the control register is a chip select control register that is associated with a corresponding chip select signal.

27. The method of claim 24, further comprising the step of:
initiating a second bus access, wherein the parameter is utilized during the second bus access.

28. The method of claim 27, further comprising the step of:
fetching at least a portion of a reset vector during the second bus access.

29. The method of claim 27, wherein the parameter specifies a data width of at least a portion of data transferred during the second bus access.

30. The method of claim 24, wherein the configuration value comprises a control section and a data section, and wherein at least a portion of the data section is conditionally used based upon information in the control section.

31. The method of claim 24, wherein the configuration value is at least a portion of a reset vector.

32. The method of claim 24, wherein a first portion of the configuration value is retrieved using a first address and a second portion of the configuration value is retrieved using a second address, and wherein the second address is not adjacent to the first address.

33. A method for configuring a data processing system, comprising the steps of:

in response to negation of a reset signal, initiating a first bus access to a storage device, wherein the first bus access is performed prior to any other bus accesses after negation of the reset signal;

retrieving a configuration value from the storage device; and before performing a subsequent bus access, configuring a parameter of the data processing system using the configuration value, wherein the parameter determines enablement of at least one of a debug feature and an emulation feature of the data processing system.

34. The method of claim 33, wherein the configuration value is at least a portion of a reset vector.

35. The method of claim 33, wherein a first portion of the configuration value is retrieved using a first address and a second portion of the configuration value is retrieved using a second address, and wherein the second address is not adjacent to the first address.

36. A method for configuring a data processing system, comprising the steps of:

in response to negation of a reset signal, initiating a first bus access to a storage device, wherein the first bus access is performed prior to any other bus accesses after negation of the reset signal;

retrieving a configuration value from the storage device; and before performing a subsequent bus access, configuring a parameter of the data processing system using the configuration value, wherein the configuration value comprises a control section and a data section, wherein use of at least a portion of the data section is conditional, and wherein at least a portion of the control section determines whether the at least a portion of the data section is used.

37. The method of claim 36, wherein a first portion of the configuration value is retrieved using a first address and a second portion of the configuration value is retrieved using a second address, and wherein the second address is not adjacent to the first address.

* * * * *

UNITED STATES PATENT AND TRADEMARK OFFICE
CERTIFICATE OF CORRECTION

PATENT NO.    : 6,625,727 B1
DATED         : September 23, 2003
INVENTOR(S)   : William C. Moyer et al.

It is certified that error appears in the above-identified patent and that said Letters Patent is hereby corrected as shown below:

Column 13,
Line 21, change "values" to -- value --.

Signed and Sealed this

Second Day of May, 2006

JON W. DUDAS
*Director of the United States Patent and Trademark Office*